United States Patent
Choi et al.

(10) Patent No.: US 7,822,720 B2
(45) Date of Patent: Oct. 26, 2010

(54) METHOD AND SYSTEM OF DETECTING KEYWORD WHOSE INPUT NUMBER IS RAPIDLY INCREASED IN REAL TIME

(75) Inventors: Jaekeol Choi, Seoul (KR);
Youngkwang Park, Seoul (KR);
Minjeong Roh, Seoul (KR); Sangyong Bae, Anyang-si (KR)

(73) Assignee: NHN Corporation, Seongnam-si (KR)

( * ) Notice: Subject to any disclaimer, the term of this patent is extended or adjusted under 35 U.S.C. 154(b) by 1100 days.

(21) Appl. No.: 11/493,443

(22) Filed: Jul. 25, 2006

(65) Prior Publication Data
US 2009/0049029 A1      Feb. 19, 2009

(30) Foreign Application Priority Data
Jul. 27, 2005    (KR) ................ 10-2005-0068522

(51) Int. Cl.
 G06F 7/00     (2006.01)
 G06F 17/30    (2006.01)
(52) U.S. Cl. ...................... 707/688; 707/706
(58) Field of Classification Search .......... 707/999.004, 707/688, 706
See application file for complete search history.

(56) References Cited

U.S. PATENT DOCUMENTS

| | | | |
|---|---|---|---|
| 6,480,810 B1 * | 11/2002 | Cardella et al. | 702/188 |
| 2002/0059272 A1 * | 5/2002 | Porter | 707/100 |
| 2003/0149727 A1 * | 8/2003 | Jaschek et al. | 709/206 |

FOREIGN PATENT DOCUMENTS

| | | |
|---|---|---|
| JP | 2000-339316 | 12/2000 |
| JP | 2004-206517 | 7/2004 |

OTHER PUBLICATIONS

Chaney, D. "Private Metrics: An Eye to the Keyhole", MediaPost Publications, downloaded from publications.mediapost.com, Jan. 2001.*

Beitzel, S.M., E.C. Jensen, A. Chowdhuy, D. Grossman and O. Frieder "Hourly Analysis of a Very Large Topically Categorized Web Query Log", Proceedings of the 27th Annual International ACM SIGIR Conference on Research and Development in Information Retrieval, Jul. 25-29, 2004, pp. 321-328.*

Beitzel, S.M., E.C. Jensen, A. Chowdhury, O. Frieder and D. Grossman "Temporal Analysis of a Very Large Topically Categorized Web Query Log", Journal of the American Society for Information Science and Technology, vol. 58, No. 2, Nov. 22, 2006, pp. 166-178.*

* cited by examiner

Primary Examiner—Luke S. Wassum
Assistant Examiner—Nicholas E Allen
(74) Attorney, Agent, or Firm—H.C. Park & Associates, PLC

(57) ABSTRACT

A method and a system of detecting a keyword whose input number is rapidly increased in real time which can estimate a search number at a future point in time by reflecting an input trend of the keyword in real time at a present point in time and can immediately detect the keyword whose input number is rapidly increased according to a criterion value calculated by the estimated search number. Specifically, the method and system of detecting a keyword whose input number is rapidly increased in real time which can estimate the search number for each keyword at the future point in time in real time and can immediately detect the keyword whose input number is rapidly increased according to a criterion value calculated by the estimated search number.

24 Claims, 4 Drawing Sheets

FIG. 3

SEARCH SERVER 1 t
- PRESENT - 05-06-22 11:29:30
- FREE STYLE - 05-06-22 11:29:28
- FREE STYLE - 05-06-22 11:29:27 t-1
- SPONGE - 05-06-22 11:29:25
- FREE STYLE - 05-06-22 11:29:24
- SPONGE - 05-06-22 11:29:24

SEARCH SERVER 2 t
- SPONGE - 05-06-22 11:29:29
- PRESENT - 05-06-22 11:29:29
- PRESENT - 05-06-22 11:29:26 t-1
- SPONGE - 05-06-22 11:29:25
- PRESENT - 05-06-22 11:29:25
- FREE STYLE - 05-06-22 11:29:25

SEARCH SERVER 3 t
- PRESENT - 05-06-22 11:29:30
- PRESENT - 05-06-22 11:29:28 t-1
- PRESENT - 05-06-22 11:29:24
- FREE STYLE - 05-06-22 11:29:24
- FREE STYLE - 05-06-22 11:29:23

FIG. 4

< DATABASE >

| TIME DATA | KEYWORD/ INPUT NUMBER |
|---|---|
| t | PRESENT / 5<br>FREE STYLE / 2<br>SPONGE / 1 |
| t-1 | FREE STYLE / 4<br>SPONGE / 3<br>PRESENT / 2 |
| ... | ... |
| t-n | PRESENT / 12 |
| ... | ... |

SLIDING WINDOW

| INPUT RANKING | KEYWORD | INPUT NUMBER WITHIN SLIDING WINDOW | ESTIMATED SEARCH NUMBER | AVERAGE SEARCH NUMBER FOR SEVEN DAYS / STANDARD DEVIATION |
|---|---|---|---|---|
| 1 | PRESENT | 601 | 76,567.4 | 26715.14 /3660.8 |
| 2 | FREE STYLE | 567 | 72,235.8 | 26693.32 /3875.65 |
| 3 | SPONGE | 487 | 61916.4 | 46687.23 /2874.66 |

B)

```
KEYWORD RANKING AT
THE PRESENT
_____

1 STAR WARDS        ↑ 428
2 PRESENT           ↑ 38
3 FREE STYLE        ↑ 82
4 PUBLIC CHARGES    ↑ 134
5 SPIRA             ↑ 48
...
_____
2005.6.22 10:57 AT THE PRESENT
```

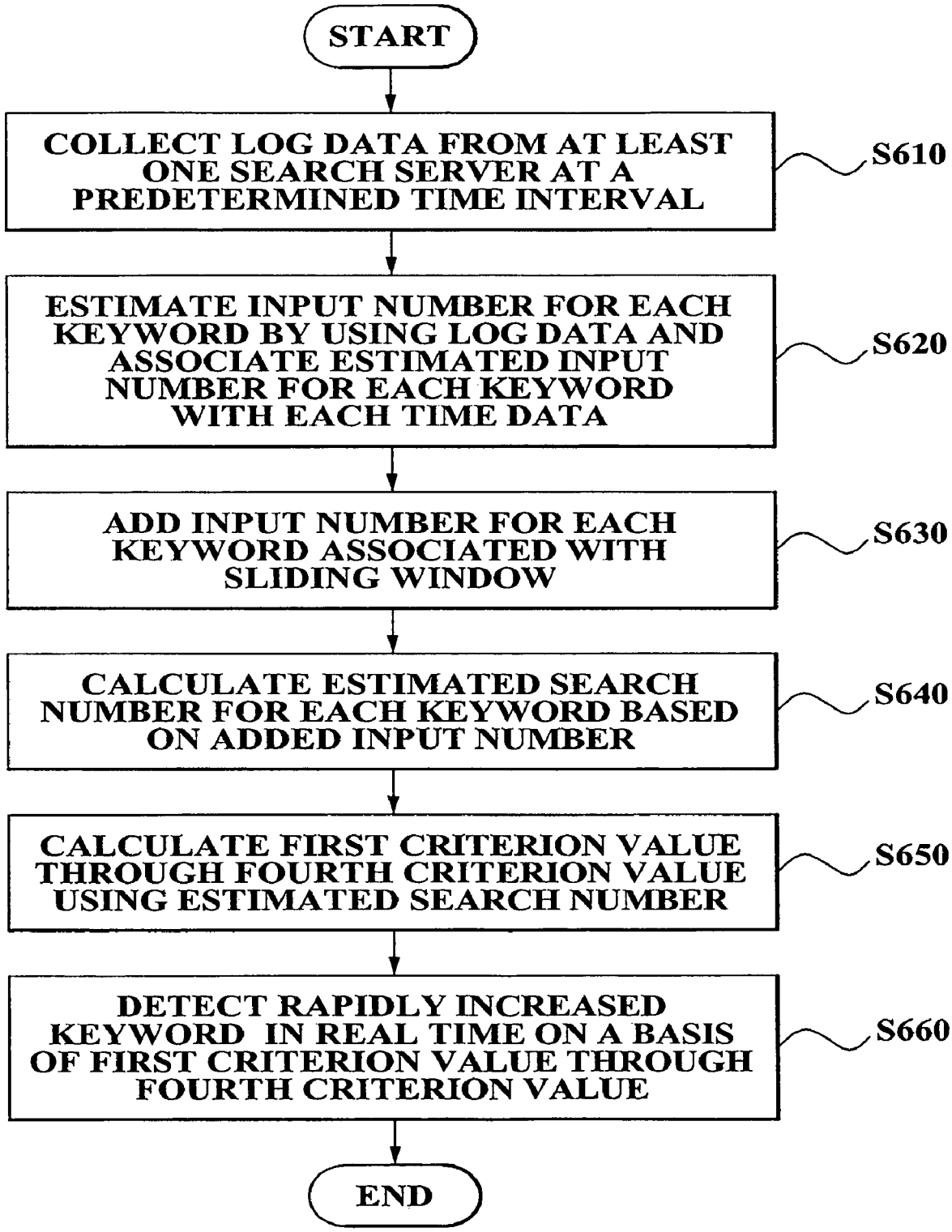

METHOD AND SYSTEM OF DETECTING KEYWORD WHOSE INPUT NUMBER IS RAPIDLY INCREASED IN REAL TIME

CROSS-REFERENCE TO RELATED APPLICATIONS

This application claims the benefit of Korean Patent Application No. 10-2005-0068522, filed on Jul. 27, 2005, in the Korean Intellectual Property Office, the disclosure of which is incorporated herein by reference.

BACKGROUND

1. Field of the Invention

The present disclosure relates to a method of detecting a keyword whose input number/rate, is rapidly increased, which an estimated search number in the future is estimated by reflecting a current input trend of the keyword in real time, and a criterion value is calculated by using the estimated search number, and subsequently the keyword whose input number is rapidly increased can be detected in real time, and a system using the method.

2. Description of the Related Art

Generally, when a keyword is input by a user, a search service system providing search service provides search result corresponding to the keyword to the user, for example, web sites including the keyword, articles including the keyword, and images having a file name including the keyword.

In the search service system, keywords input by users may vary. However, in actuality, a ratio that accounts for 1000 plus keywords, being input by users and which rank high from among a number of keywords, is very high and a ratio that account for other terms is very low. That is, high-level search service can be provided to users via a customization service that chiefly provides a search result of several high-ranked keywords whose search request number is large.

To analyze these high-ranked keywords, there is a first case of usually high-ranked keywords, for example, "game", "go-stop", and "entertainers", and a second case of keywords belonging to the high-ranked keywords due to rapidly elevated rank in a predetermined period.

Most Internet search service providers provide customized information to users in association with the first case. Also, since it is very difficult to recognize and detect keywords whose input number is rapidly increased, Internet search service providers can not properly cope with the second case, and recognize such a case only after much time passes. In this case, at the point in time that Internet search service providers finally recognize and try to cope with the second case, there is no meaning to cope with the second case since the rank of the keywords already begins to fall.

In the second case, a method in which a human discerns terms that are frequently shown in articles and estimates the terms as rapid increase keywords may be used. However, since detecting the rapid increase keywords by the described method may be executed after the keywords are already widely known to public, the detecting is too late. In addition, keywords can not be detected over all fields.

On the other hand, Korean Patent Publication No. 2001-0086259 discloses an Internet search engine providing high-flyers hit catalog which is a catalog in which web pages whose popularity is rapidly increased among searchers. The high-flyers hit catalog indicates the catalog of sites which click frequency of users is rapidly increased.

The Internet search engine measures the click number with respect to each site's accumulated click number until a current point in time with respect to the each site during a predetermined period, computes population change rate of the each site, and provides sites whose population is rapidly increased as the high-flyers hit catalog to the searcher.

However, in case that the Internet search engine is used, a predetermined period to watch an input trend of a click number is still required, and lists of sites whose input number is rapidly increased may be determined only after the predetermined period passes.

Ultimately, though the Internet search engine is used, Internet search service providers still can not detect a keyword whose input number is rapidly increased at the present point in time during the predetermined time, therefore, Internet search service providers can not properly respond and recognize until after a relatively long time. Subsequently, customized service that provides an optimized search result regarding the keywords whose input number is rapidly increased at the present point in time can not be provided to a user in a suitable point in time.

Accordingly, a new method of immediately detecting a keyword whose input number is rapidly increased at a present moment by reflecting an input trend of the keyword in real time at the present point in time has been earnestly required. Accordingly, a customized service that provides an optimized search result regarding the keywords whose input number is rapidly increased at the present point in time can be provided to users, and consequently a search number of the users can be increased and search time of the users can be improved.

SUMMARY

The present disclosure provides a method and system of detecting a keyword whose input number is rapidly increased in real time which can estimate an estimated search number for each keyword at a future point in time by reflecting an input trend of the keyword in real time at a present point in time, and can immediately detect the keyword whose input number is rapidly increased according to a criterion value calculated by the estimated search number.

The present disclosure also provides a method and system of detecting a keyword whose input number is rapidly increased in real time which can immediately detect the keyword in real time by reflecting an input trend of the keyword in real time at a present point in time, contrary to a conventional art determining the rapidly increased keyword after calculating an input number of the keyword during a predetermined period.

The present disclosure also provides a method and system of immediately and effectively detecting a keyword whose input number is rapidly increased in real time, and which can be disclosed to a searcher by continuously updating a rapidly increased keyword list and can immediately transmit information regarding an input trend of the keyword at the present moment to the searcher.

The present disclosure also provides a method and system of immediately detecting a rapidly increased keyword whose input number is rapidly increased in real time which can increase a search number and Internet access time of the users by immediately detecting the keyword, subsequently Internet search service providers may increase profits.

According to an aspect of the present disclosure, there is provided a method of detecting a keyword whose input number is rapidly increased in real time, the method includes: collecting log data from at least one search server at each predetermined time interval, wherein the log data includes the keyword input from a user terminal; estimating an input number of each of the keywords, by using the collected log data, and storing the estimated input number in association with each time data in a database; identifying at least one of the each time data belonging to a predetermined sliding window by referring to the database, and adding the input number for each of the keywords associated with the identified at least one of the each time data; calculating an estimated search number for each of the keywords on a basis of the added input number; determining an input ranking for each of the keywords on a basis of the added input number, and calculating a third criterion value for each of the keywords by using the determined input ranking; calculating a fourth criterion value for each of the keywords by using a predetermined minimum search number and the estimated search number; and detecting a rapidly increased keyword in real time on a basis of the third criterion value and the fourth criterion value.

According to another aspect of the present disclosure, there is provided a system of detecting a keyword having an input number rapidly increased in real time, the system including: a log collection unit collecting log data from at least one search server at each predetermined time interval, wherein the log data includes the keyword input from a user terminal; an input number estimation unit estimating an input number of each of the keywords by using the collected log data, and storing the estimated input number in association with each time data in a database; an input number adding up unit identifying at least one of the each time data belonging to a predetermined sliding window by referring to the database, and adding the input number for each of the keywords associated with the identified at least one of the each time data; a search number calculation unit calculating an estimated search number for each of the keywords on a basis of the added input number; a criterion value calculation unit calculating first through fourth criterion values by using the estimated search number; and a keyword detection unit detecting a rapidly increased keyword in real time on a basis of the third criterion value and the fourth criterion value.

BRIEF DESCRIPTION OF THE DRAWINGS

The above and/or other aspects and advantages of the present disclosure will become apparent and more readily appreciated from the following detailed description, taken in conjunction with the accompanying drawings of which:

FIG. 3 is a diagram illustrating an embodiment of log data according to an embodiment of the present disclosure;

FIG. 4 is a diagram illustrating an embodiment of a database according to an embodiment of the present disclosure;

FIG. 5A is a diagram illustrating an embodiment of calculating an estimated search number for each of the keywords according to an embodiment of the present disclosure, and FIG. 5B is a diagram illustrating an embodiment of detecting a rapidly increased keyword in real time according to an embodiment of the present disclosure; and FIG. 6 is a flowchart illustrating detailed operations of detecting a rapidly increased keyword in real time according to an embodiment of the present disclosure.

DETAILED DESCRIPTION

Figure 1:
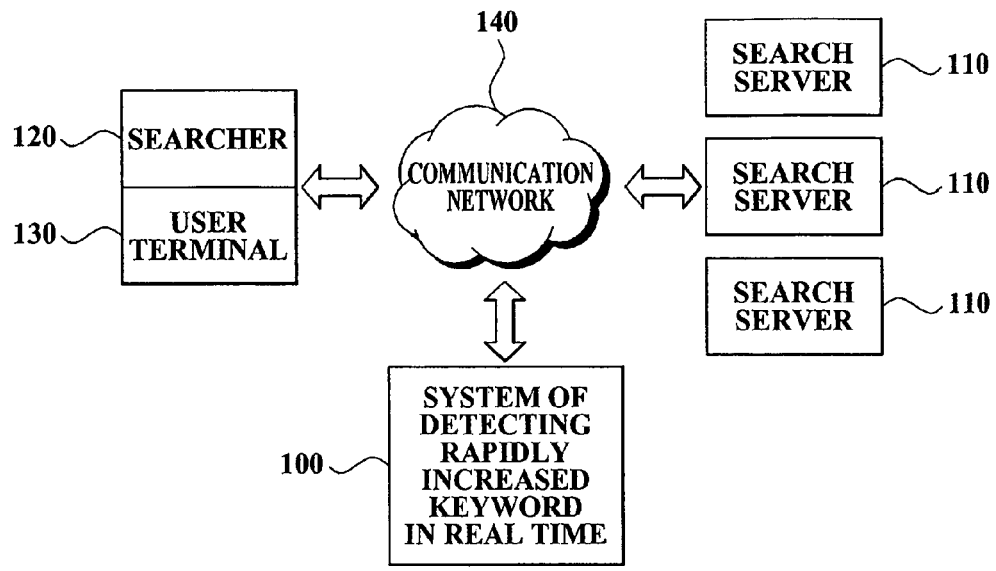
FIG. 1 is a diagram illustrating a network connection of a system of detecting a rapidly increased keyword in real time according to an embodiment of the present disclosure.

Reference will now be made in detail to embodiments of the present disclosure, examples of which are illustrated in the accompanying drawings, wherein like reference numerals refer to the like elements throughout. The embodiments are described below in order to explain the present disclosure by referring to the figures.

The term "rapidly increased keyword" continuously used throughout the present specification may indicate a keyword input from at least one search server, whose input number is rapidly increased at the present moment than usual. In one embodiment, a rapidly increased keyword is a keyword that is currently being input to the system at a rate much higher than its past average.

The rapidly increased keyword allows a searcher to recognize other searchers' input trend and to be provided with information regarding a keyword attracting other searchers attention more than usual, and furthermore, from the viewpoint of Internet search service providers, the searcher provided with the information about the keyword may be induced to input the keyword, so that a search number and search time may be increased. Accordingly, Internet search service providers may increase profits.

FIG. 1 is a diagram illustrating a network connection of a system of detecting a rapidly increased keyword in real time 100 according to an embodiment of the present disclosure. As used herein, in certain embodiments detecting data in real time refers to detecting the current state of a data without any perceptible delay.

The system of detecting the rapidly increased keyword in real time 100 detects a keyword whose input number is rapidly increased in the present moment to be more than usual, and provides each search server 110 with the detected keyword arranged according to a degree of being rapidly increased, e.g. a size of a criterion value. Specifically, the system of detecting the rapidly increased keyword in real time 100 may immediately and accurately detect the rapidly increased keyword by reflecting a current input trend of a searcher 120 in real time.

Initially, the search server 110 may indicate a search engine server which provides the searcher 120 with a search service easily connecting the searcher 120 to a website containing contents with information to be searched, i.e. the search server 110 provides brief information with regard to a predetermined contents provider, and the contents provider may provide information that the searcher 120 requires, in response to a search request of the searcher. Accordingly, time spent for searching the contents information may be reduced and proximity of searched information may increase.

In this case, the search request may occur according to an input keyword from a predetermined searching box by the searcher 120, the search server 110 may provide the searcher 120 with the brief information corresponding to the input keyword.

Specifically, the search server 110 may generate and maintain log data as a record history with respect to keywords input by the searcher 120. The log data may include a keyword input by the searcher 120 and time information regarding an input time of the keyword, and the search server 110 may process the record for the log data whenever keywords are input.

The searcher 120, having a user terminal 130 to connect the search server 110, may indicate an Internet user who generates the search request for the website containing contents information to be searched by inputting the keyword in the searching box. Also, since the searcher 120 is provided with a rapidly increased keywords list provided from the system 100 via the search server 110, the searcher 120 may be provided with information regarding a rapidly increased keyword attracting other searchers attention more than usual.

The user terminal 130 maintains a connection state with the system 100 through a communication network 140 and may display the rapidly increased keyword detected by the system 100. The user terminal 130 may indicate an entire terminal having a predetermined processing ability, e.g. an MP3 player, an electronic dictionary, a cellular phone, a smart phone, and the like, by having a predetermined memory unit and microprocessor.

The system 100 detects a keyword whose input number is rapidly increased as the rapidly increased keyword by continuously collecting log data from at least one of the search servers 110 at each predetermined time interval, processing and analyzing the collected log data. Hereinafter, by referring to FIG. 2, a system of detecting a keyword whose input number is rapidly increased according to an embodiment of the present disclosure will be described.

Figure 2:
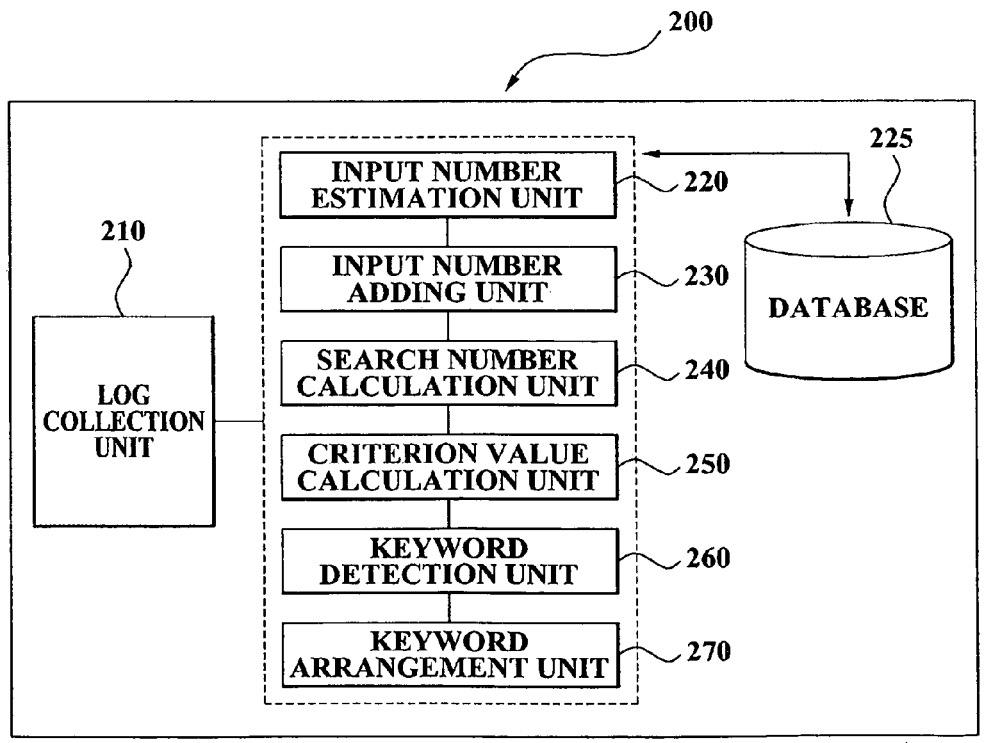
FIG. 2 is a configuration diagram illustrating a system of detecting a rapidly increased keyword in real time according to an embodiment of the present disclosure.

FIG. 2 is a configuration diagram illustrating a system of detecting the rapidly increased keyword in real time 200 according to an embodiment of the present disclosure.

The system 200 comprises a log collection unit 210, an input number estimation unit 220, an input number adding unit 230, a search number estimation unit 240, a criterion value calculation unit 250, and a keyword detection unit 260.

The log collection unit 210 collects log data from at least one search server at each predetermined time interval. In this case, the each time interval may be a predetermined length of period of time flexibly established by a provider of the system 200, and may be established to be as short a period as possible in order to more accurately detect the rapidly increased keyword. Namely, the log collection unit 210 checks a trend of keywords newly input to the search server 110 through the collected log data for a period of time established as the time interval. As described above, the log data includes the keyword input from a user terminal 130 and information regarding an input time, e.g. the log collection unit 210 having a period of time for collecting log data is established as five seconds may obtain information regarding a keyword newly recorded in each of the search servers 110, for a period of time from the present moment to the previous five seconds, on a basis of the input time of the log data.

The input number estimation unit 220 estimates an input number of each keyword by using the collected log data, and storing the estimated input number in association with each time data in a database 225. In one embodiment, the input number estimation unit 220 estimates the number of times a keyword was input to a server based on collected log data, and stores the number in a database 225. Specifically, the input number estimation unit 220 identifies the keyword newly input during the period of time through the log data, and counts an input number on a basis of the identified keyword. Also, the input number estimation unit 220 may generate time data associated with the collected log data and correspond the generated time data to the input number for each keyword to store in the database 225. Accordingly, the keyword input from the user terminal 130 and information regarding an input trend for each of the keywords before the present moment in the database 225 are continuously accumulated, stored, and classified at each time interval.

The input number adding unit 230 identifies at least one time data belonging to a predetermined sliding window by referring to the database 225, and adding the input number for the each keyword associated with the identified time data. In one embodiment, the input number adding unit 230 calculates the number of times a keyword was input into a search server during a set time period, such as a predetermined sliding window. In this case, the sliding window may indicate a virtual time scope determining information to be searched in the database 225 and may selectively search information stored in the database 225 for an n period.

The n period is flexibly established by the system provider, for example, may be established as a former n period, i.e. n is greater than zero, on a basis of time data most recently stored in the database 225. Also, when the n period of the sliding window is fixed, the sliding window excludes old information that has been stored for a long time as time passes a search object in order to maintain information, comparatively recent information to the present moment, to be searched. The old information may indicate information stored after exceeding the n period from the present moment.

The input number adding unit 230 identifies time data belonging to the n period of the sliding window and a keyword and an input number corresponding to the time data in the database 225, and adds the input number for each keyword. Namely, the input number adding unit 230 calculates the keyword input in each of the search server 110 within a certain time scope determined by the sliding window and the information regarding an accumulated input number for each of the keywords.

The search number calculation unit 240 calculates an estimated search number for each of the keywords on a basis of the added input number, i.e. the search number calculation unit 240 estimates an estimated input number on a basis of the input number for the each keyword which is calculated within a certain time scope, comparatively recent to the present moment. In one embodiment, the search number calculation unit 240 estimates the current rate of input of a keyword based on the past input rate of a keyword within a certain time frame. In this case, after the search number calculation unit 240 excludes an intentionally manipulated keyword, the search number calculation unit 240 may estimate the search number by using keywords input for an exclusive search. Namely, when an advertisement provider purposely inputs a specific keyword to increase an input number, the search number calculation unit 240 determines the keyword as a deceptive keyword and executes the predetermined exclusion process in order to not reflect an associated input number to the calculating of the estimated search number. A reference time for calculating of the estimated search number may be flexibly established by the system provider, for example the reference time maybe established on a basis of one day. Hereinafter, by referring to FIGS. 3 through 5, the calculating of the estimated search number for each keyword will be described in detail.

FIG. 3 is a diagram illustrating an embodiment of log data according to an embodiment of the present disclosure.

Search servers 1 through 3 record an input history of a corresponding keyword when the keyword is input by the searcher 120 requesting to be provided with a search service. As illustrated in FIG. 3, a keyword and an input time of the keyword are correspondingly recorded in the log data. As an example, keywords 'free style', 'free style' and 'present' are recorded in log data, generated by a search server 1, during an established time interval 't'. Next, the input number estimation unit 220 estimates an input number for each of the keywords input during each of the time intervals by using log data collected from each of the search servers 1 through 3.

FIG. 4 is a diagram illustrating an embodiment of a database according to an embodiment of the present disclosure.

FIG. 4 shows a database populated with example data, and the estimated input number for each of the keywords is stored in association with each time data associated with the above time interval, i.e. the input number estimation unit 220 may estimate a keyword and a sum of the input number for each of the keywords, input in the search servers 1 through 3, during the time interval 't' as 'present-five times, free style-twice, sponge-once', and the estimation result may be stored in the database 225 in association with the time data 't'.

Also, the sliding window determining a time scope used for estimating of the estimated search number is illustrated in FIG. 4. The sliding window is an n period of the. time scope, selects time data 't through t-n', and the input number adding unit 230 in FIG. 2 identifies the keyword and the input number for each of the keywords corresponding to the time data 't through t-n'. Next, the input number adding unit 230 adds the input number for each of the keywords by using the identified information.

FIG. 5A is a diagram illustrating an embodiment of calculating an estimated search number for each of the keywords according to an embodiment of the present disclosure, and FIG. 5B is a diagram illustrating an embodiment of detecting a rapidly increased keyword in real time according to an embodiment of the present disclosure.

In FIG. 5A, the embodiments of the input number for each of the keywords identified and added within the time scope of the sliding window and a corresponding estimated search number are illustrated. In the embodiments, the input number adding unit 230 adds the input number belonging to time data for each of the keywords 'present-601 times', 'free style-567 times' and 'sponge-487 times'.

The search number calculation unit 240, on a basis of the input number for the each keyword, estimates an search number for each of the keywords, a daily estimated search number for example, 'present-601 times', 'free style-567' times and 'sponge487 times', may be estimated by multiplying a converting value, for example '127.4', by each of the input numbers. The converting value '127.4' applied in the above embodiment may be flexibly established by a provider of the system 200 and determined to be an optimal value obtained through sufficient experiments and calculations.

In FIG. 5B, the embodiments of a rapidly increased keyword list, detecting a rapidly increased keyword on a basis of a criterion value, calculated by the estimated search number for each of the keywords, and arrange the detected and rapidly increased keyword according to the criterion value, are illustrated. In certain embodiments, criterion values are used to detect changes in the input rate of a keyword. Keywords 'present' and 'free style' in the embodiment are keywords detected by being determined as a keyword whose input number is rapidly increased at the present moment more than usual. When a criterion of the keyword 'present' is comparatively higher than the keyword 'free style', the system 200 of detecting a keyword whose input number is rapidly increased in real time, according to an embodiment of the present disclosure, generates a rapidly increased keyword list arranging the keyword 'present' in a higher ranking than the keyword 'free style' and provides the search server 110 with the list to be disclosed to the searcher 120.

Therefore, according to an embodiment of the present disclosure, an estimated search number in the future may be estimated by using an input trend of the keyword at present moment.

The criterion value calculation unit 250 calculates first through fourth criterion values by using the calculated estimated search number, and the keyword detection unit 260 detects the rapidly increased keyword in real time on a basis of the first through fourth criterion values. In this case, the criterion values may be a type of value information determining whether an associated keyword is the rapidly increased keyword, and the keyword detection unit 260 detects a keyword having a comparatively greater value than a predetermined value as the rapidly increased keyword. In one embodiment, the keyword detection unit 260 detects if a keyword has a comparatively greater input rate than its previously average or estimated input rate.

Prior to calculating the first through the fourth criterion values, the system 200 may calculate an average search number and a standard deviation for each of the keywords as a calculation factor used for the criterion values. The average search number and the standard deviation may be calculated by using a general method of calculating an average search number and a standard deviation. In one embodiment, the average search number of a keyword is an average search rate of a keyword.

The calculating of the average search number and the standard deviation is for preparing an accurate criterion capable of precisely determining the rapidly increased keyword, and the system 200 may detect a keyword whose input number is rapidly increased more than usual as the rapidly increased keyword.

In the calculating of the average search number and the standard deviation, the system 200 may obtain the average search number by identifying time data associated with a predetermined m period by referring to the database 225, adding an input number associated with the identified time data for each of the keywords, and dividing the added input number by the m period. In this case, the m period may be a sufficient period capable of accurately calculating the average of the input number and may be established as a period longer than the n period of the sliding window. The standard deviation is calculated by calculating an arithmetical average by squaring each deviation, a resulting value of a subtraction between the daily input number and the average search number, during the m period and squaring the arithmetical average.

Namely, the system 200 of detecting the rapidly increased keyword in real time is type of criterion data for calculating the criterion values, and the data may be maintained by calculating the average search number and the standard deviation for each of the keywords input during a sufficient period of time. When the m period is seven days, the system 200 may calculate an average search number as '26715.14', and a standard deviation as '3660.8' for the keyword 'present', on a basis of an input number during the seven says.

Next, the criterion value calculation unit 250 may calculate a first criterion value by using the average search number and the standard deviation for each of the keywords. The first criterion value may be generated by adding a result of multiplying the standard deviation by a predetermined value, with the average search number, the predetermined value may be, for example, three. In this case, the first criterion value is represented as "average+(3*standard deviation)".

Next, the keyword detection unit 260 compares the estimated search number and the first criterion value for each of the keywords and detects a keyword having an estimated search number over the first criterion value.

Also, the criterion value calculation unit 250 may calculate a second criterion value for each of the keywords by using an exponentially weighted moving average (EWMA) control chart. In this case, the second criterion value may be upper control limit information for each keyword calculated by using the EWMA control chart.

Generally, control charts are widely used for various purposes. The EWMA control chart is most widely used because of being simply generalized and being able to detect a small change. In order to satisfactorily manufacture goods to fit standards in a manufacturing process of goods, it is very important to continuously monitor the quality of goods in the process of production. The EWMA control chart is generally used for solving the problem.

According to the present embodiment, the EWMA control chart is used for detecting a rapidly increased keyword, thereby monitoring a tendency of an input number with respect to one of the keywords according to time change.

The method of detecting the rapidly increased keyword according to the present embodiment may be shown as a statistical matter as follows. First, a usual input number with respect to a keyword is assumed to be a normal distribution in which the average is $\mu_0$, and the distribution is $\sigma^2$. A keyword detection unit 260 determines whether the average with respect to the keyword changes everyday. When the determining the average is changed at a point in time, this change means that the interest of users, with respect to the keyword, is different from previous times. The keyword detection unit 260 may detect the changing keyword as a keyword for the current point in time.

The problem is solved by using the EWMA control chart as follows. Considering a statistic as follows, at the point in time t, $$Z_t = pX_t + (1-p)Z_{t-1} \qquad \text{<Equation 1 statistic } Z_t\text{>}$$

A statistic $Z_t$ is considered where a weight p is added to the input number measured at the point in time t, and a weight (1−p) is added with respect to a statistic at an immediately preceding point in time. Through this, the average movement is considered while adding a large weight to a current measurement value. Equation 1 is expressed again as follows.

$$Z_t = pX_t + p\sum_{i=1}^{t-1}(1-p)^i X_{t-i} \qquad \text{< Equation 2 statistic } Z_t\text{ >}$$

On the other band, the distribution of statistic $Z_t$ may be computed as follows.

$$\text{var}(Z_t) = \sigma^3\left(\frac{p}{2-p}\right)(1-(1-p)^{2t}) \qquad \text{< Equation 3 the distribution of statistic } Z_t\text{ >}$$

Also, an upper control limit as follows may be computed by using a general management theory.

$$UCL = \bar{x} + 3\hat{\sigma}\sqrt{\frac{p}{2-p}} = \bar{x} + 3\frac{M\bar{R}}{d_2}\sqrt{\frac{p}{2-p}} \qquad \text{< Equation 4 an upper control limit>}$$

In Equation 4, $d_2$ may use 1.128 as a coefficient making $\hat{\sigma}$ as an unbiased estimator, and $M\bar{R}$ is a number averaging movement ranges. Specifically, $M\bar{R}$ may be expressed as $$M\bar{R} = \frac{1}{t-1}\sum_{i=2}^{t} MR_i, \quad MR_i = x_i - x_{i-1}.$$

According to the method of detecting the rapidly increased keyword by using the EWMA control chart, according to the current embodiment, the keyword detection unit 260 may determine the rapidly increased keyword as the average changes in the case $Z_t$, computed at each point in time, is greater than UCL, and detects a keyword as the rapidly increased keyword as described above.

Also, the criterion value calculation unit 250 determines an input ranking for each of the keywords on a basis of an added input number, i.e. the added input number which has been located by the sliding window, and may calculate a third criterion value for each of the keywords by using the determined input ranking. In one embodiment, an input ranking is the relative ranking of a keyword based on the number of times it was input during a set period of time.

The third criterion value is an inverse number of the determined input ranking, may be represented by, $$\frac{1}{\text{INPUT RANKING}},$$

i.e. the criterion value calculation unit 250 may calculate a higher third criterion value in association with keywords input in a highly frequently matter at the present moment. As an example, when input numbers within the sliding window are shown as in FIG. 4, in the criterion value calculation unit 250, the 'present', i.e. a keyword whose input number is highest, is determined as a first input ranking, and 'free style' is determined as a second input ranking. Also, the criterion value calculation unit 250 may calculate a second criterion value by using each of the determined input rankings, and the keyword detection unit 260 may calculate the 'present', i.e. a keyword having a second criterion value comparatively higher and having a third criterion value '1', as a keyword whose input number is rapidly increased.

Also, the criterion value calculation unit 250 may calculate a fourth criterion value for each of the keywords by using a determined rapidly increased minimum search number and the estimated search number. In this case, the rapidly increased minimum search number is a search number of the lowest value permitting the keyword to be detected, and the fourth criterion value is calculated by, $$\frac{\text{AVERAGE SEARCH NUMBER}}{\text{MINIMUM SEARCH NUMBER}}.$$

Specifically, the criterion value calculation unit 250, in order to prevent a keyword having an input number with sharp fluctuations from being detected as the rapidly increased keyword, may calculate a lower fourth criterion value in association with a keyword having a lower estimated search number than a rapidly increased minimum search number, even though the keyword having an input number with sharp fluctuations has an input number that is comparatively lower.

As an example, when a rapidly increase search number is '70,000', an estimated search number represented in FIG. 5A, the criterion value calculation unit 250 may calculate a fourth criterion value for a keyword 'sponge' as greater than zero, i.e. 0.885≈61916.4/70000, and the keyword detection unit 260 may exclude the keyword 'sponge' as a candidate of the rapidly increased keyword. Also, the keyword detection unit 260 may preferentially detect a keyword 'present' whose a fourth criterion value, i.e. 1.094≈76567.4/70000, is comparatively higher as the rapidly increased keyword.

Accordingly, according to the present disclosure, information regarding a most popular keyword may be immediately and accurately identified since keywords whose input numbers are rapidly increased from the searcher 120 at the present moment is detected in real time.

Also, the system 200 of detecting a keyword whose input number is rapidly increased of the present disclosure arranges a detected rapidly increased keyword according to a predetermined arrangement rule and discloses the keyword to the searcher 120 connecting the search server 110.

In this case, the system 200 of detecting a keyword whose input number is rapidly increased of the present disclosure may further include a keyword arrangement unit 270 generating a rapidly increased keyword list by arranging the detected keyword according to a size of the calculated first through fourth criterion values. In one embodiment, the keyword arrangement unit 270 ranks keywords based on their current estimated input rate, which is based on prior input numbers within a time interval. Namely, the keyword arrangement unit 270 generates the rapidly increased keyword list by giving a preferentially detected keyword higher ranking, and intentionally discloses the rapidly increased keyword list to the searcher 120 connecting the search server 110 by providing the rapidly increased keyword list. Referring to FIG. 5B, the keyword arrangement unit 270 may continuously update the list disclosed to the searcher 120 by generating the rapidly increased keyword list at the aforementioned time interval, i.e. a period of collecting the log data, and may immediately transmit information regarding an input trend of the keyword at the present moment to the searcher 120.

Hereinafter, a flow of operations of the system 200 of detecting a keyword whose input number is rapidly increased in real time according to an embodiment of the present disclosure will be described in detail.

FIG. 6 is a flowchart illustrating detailed operations of detecting a rapidly increased keyword in real time according to an embodiment of the present disclosure. A method of detecting a rapidly increased keyword in real time is executed by the above described system 200 of detecting a keyword whose input number is rapidly increased in real time.

Initially, in operation S610, the system 200 of detecting a keyword whose input number is rapidly increased in real time collects the log data from the search server 110 at a predetermined time interval. The operation S610 is an operation that the searcher 120 gains information regarding an input trend of newly input keywords through the search server 110 during an established time internal, and when the time interval is established as, for example 'five seconds', the system 200 of detecting a keyword whose input number is rapidly increased in real time may selectively collect log data recording newly input keywords to the search server 110 from the present moment to a previous five seconds.

In operation S620, the system 200 of detecting a keyword whose input number is rapidly increased in real time calculates an input number for each keyword by using a collected log data, and stores a calculated input number for each of the keywords in association with one time data in the database 225. Again referring to FIG. 4, the operation S620 adds an input number newly input at the predetermined time interval on a basis of a keyword and stores an added input number by corresponding to the time data in the database 225.

In operation S630, the system 200 of detecting a keyword whose input number is rapidly increased in real time identifies at least one time data belonging to the sliding window by referring to the database, and adds the input number for the each keyword associated with the identified time data. The operation S630 is an operation of establishing the sliding window including an n period for searching information in order to reflect an input trend of the keyword at the present moment. Specifically, again referring to FIG. 4, the system 200 of detecting a keyword whose input number is rapidly increased in real time in operation S630 may selectively search information stored in the data base 225 during the n period.

In operation S640, the system 200 of detecting a keyword whose input number is rapidly increased in real time calculates an estimated search number for each of the keywords on a basis of an added input number. Referring to FIG. 5B, the operation S640 is an operation estimating a search number in the future by reflecting an input trend of the keyword during a short period, for example, a daily estimated search number that may be estimated by multiplying a converting value '127.4' by an added input number for each of the keywords.

In operation S650, the system 200 of detecting a keyword whose input number is rapidly increased in real time calculates a first through a fourth criterion value. The operation S650 is an operation calculating a criterion value, i.e. a basis of being capable of detecting a rapidly increased keyword among keywords, by using the estimated search number. Initially, the system 200 of detecting a keyword whose input number is rapidly increased in real time in the operation S650 may calculate a first criterion value by using an average search number and a standard deviation for each of the keywords. The first criterion value may be generated by adding a resulting value of multiplying the standard deviation by a predetermined value, with the average search number and the predetermined value may be, for example, three. In this case, the first criterion value is represented as "average+(3*standard deviation)".

Also, the system 200 of detecting a keyword whose input number is rapidly increased in real time in operation S650 may calculate a second criterion value for the each keyword by using an exponentially weighted moving average (EWMA) control chart. In this case, the second criterion value may be upper control limit information for each of the keywords calculated by using the EWMA control chart.

Also, the system 200 of detecting a keyword whose input number is rapidly increased in real time determines, in the operation S650, an input ranking for each of the keywords on a basis of an added input number, i.e. the added input number which has been retrieved by the sliding window, and may calculate a third criterion value for each of the keywords by using the determined input ranking. In this case, the third criterion value is an inverse of the determined input ranking, and may be represented by, $$\frac{1}{\text{INPUT RANKING}}.$$

Also, the system 200 of detecting a keyword whose input number is rapidly increased in real time may calculate, in operation S650, a fourth criterion value for each of the keywords by using a determined rapidly increased minimum search number and the estimated search number. In this case, the rapidly increased minimum search number is a search number of the lowest value permitting the keyword to be detected, and the fourth criterion value is calculated by, $$\frac{\text{AVERAGE SEARCH NUMBER}}{\text{MINIMUM SEARCH NUMBER}}.$$

In operation S660, the system 200 of detecting a keyword whose input number is rapidly increased in real time detects a rapidly increased keyword on a basis of the first through the fourth criterion. The operation S660 is an operation detecting a keyword whose input number is rapidly increased at the present moment among at least one keyword within the sliding window as the rapidly increased keyword.

Thus, according to the present disclosure, contrary to a convention art determining a rapidly increased keyword after calculating an input trend of the keyword during a predetermined period, the rapidly increased keyword may be detected by reflecting an input trend of the keyword at the present moment in real time.

The method of detecting a keyword whose input number is rapidly increased in real time according to the above-described embodiment of the present disclosure may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present disclosure.

According to another aspect of the present disclosure, there is provided a method and a system of detecting a keyword whose input number is rapidly increased in real time which can estimate a search number for each keyword at a future point in time by reflecting an input trend of the keyword in real time at a present point in time, and the keyword whose input number is rapidly increased can be immediately detected by using the estimated search number.

According to another aspect of the present disclosure, there is provided a method and a system of detecting a keyword whose input number is rapidly increased in real time which can immediately detect the keyword in real time by reflecting an input trend of the keyword in real time at a present point in time, contrary to a conventional art determining the rapidly increased keyword after calculating an input number of the keyword during a predetermined period.

According to another aspect of the present disclosure, there is provided a method and a system of detecting a keyword whose input number is rapidly increased in real time and which can be disclosed to a searcher by continuously updating a rapidly increased keyword list and can immediately transmit information regarding an input trend of the keyword at the present moment to the searcher.

According to another aspect of the present disclosure, there is provided a method and a system of detecting a keyword whose input number is rapidly increased in real time which can increase a search number and Internet access time of the users by immediately detecting the keyword, subsequently Internet search service providers may increase profits.

Although a few embodiments of the present disclosure have been shown and described, the present disclosure is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method for detecting a rate of input, the method comprising:
   collecting log data comprising at least one input keyword from at least one search server during a time interval;
   determining an input rate of the at least one input keyword using the log data, and storing the input rate of the at least one input keyword in association with input time data in a database;
   identifying, in the database, the input time data associated with the at least one input keyword during a sliding window, and determining a number of times the at least one input keyword has been input to the at least one search server during the sliding window;
   determining an estimated search input rate of the at least one input keyword by referring to the number of times the at least one input keyword has been input to the at least one search server during the sliding window;
   ranking the at least one input keyword using the number of times the at least one input keyword has been input to the at least one search server during the sliding window;
   determining a first criterion value for the at least one input keyword by using the ranking;
   determining a second criterion value for the at least one input keyword by using a minimum search number and the estimated search input rate; and
   detecting in real time an input keyword having an increased input rate, based on the first criterion value and the second criterion value.

2. The method of claim 1, wherein the sliding window comprises a period of length n, wherein n is greater than zero; and
   wherein the identifying of the at least one input time data comprises identifying at least one time entry included in a prior period of length n on the basis of recently received input time data.

3. The method of claim 1, further comprising:
   determining a third criterion value using an average search number and a standard deviation for the at least one input keyword;
   wherein detecting the increased input rate of the at least one input keyword comprises reference to the third criterion value.

4. The method of claim 3, wherein the third criterion value is determined by adding the average search number to a product of the standard deviation and a multiplier number.

5. The method of claim 4, wherein the number is three.

6. The method of claim 1, further comprising:
   determining a fourth criterion value for the at least one input keyword by using an exponentially weighted moving average control chart;
   wherein detecting the increased input rate of the at least one input keyword comprises reference to the fourth criterion value.

7. The method of claim 6, wherein the fourth criterion value comprises upper control limit information for the at least one input keyword calculated using the exponentially weighted moving average control chart.

8. The method of claim 1, wherein the first criterion value comprises an inverse of the ranking of the at least one input keyword.

9. The method of claim 1, wherein the minimum search number comprises a search number with the lowest value permitting the at least one input keyword to be detected; and
wherein the second criterion value is calculated by dividing the average search number by the minimum search number.

10. The method of claim 1, further comprising:
identifying, in the database, input time data associated with a period of length m, and determining a number of times the at least one input keyword has been input to the at least one search server during the period of length m; and
determining an average search input rate for the at least one input keyword, or a standard deviation for the at least one input keyword, using the number of times the at least one input keyword has been input to the at least one search server during the period of length m.

11. The method of claim 1, further comprising:
generating a list comprising the at least one input keyword having an increased input rate; and
providing the at least one search server with the list, wherein the list is updated at the time interval.

12. A method of detecting a rate of input, the method comprising:
collecting log data comprising at least one input keyword from at least one search server during a time interval;
determining an input rate of the at least one input keyword using the log data, and storing the input rate of the at least one input keyword in association with input time data in a database;
identifying, in the database, the input time data associated with the at least one input keyword during a sliding window, and determining a number of times the at least one input keyword has been input to the at least one search server during the sliding window;
determining an estimated search input rate of the at least one input keyword by referring to the number of times the at least one input keyword has been input to the at least one search server during the sliding window;
ranking the at least one input keyword using the number of times the at least one input keyword has been input to the at least one search server during the sliding window;
determining a criterion value for the at least one input keyword, wherein the criterion value is calculated using an inverse of the ranking of the at least one input keyword; and
detecting in real time an input keyword having an increased input rate, based on the criterion value.

13. A method of detecting a rate of input, the method comprising:
collecting log data comprising at least one input keyword from at least one search server during a time interval;
determining an input rate of the at least one input keyword using the log data, and storing the input rate of the at least one input keyword in association with input time data in a database;
identifying, in the database, the at input time data associated with the at least one input keyword during a sliding window;
determining a number of times the at least one input keyword has been input to the at least one search server during the sliding window;
determining an estimated search input rate of the at least one input keyword by referring to the number of times the at least one input keyword has been input to the at least one search server during the sliding window;
determining a criterion value for the at least one input keyword, wherein the criterion value is calculated by dividing an average search number by a minimum search number; and
detecting in real time an input keyword having an increased input rate, based on the criterion value.

14. A non-transitory computer-readable medium comprising instructions which, when executed, performs the steps of:
collecting log data comprising at least one input keyword from at least one search server during a time interval;
determining an input rate of the at least one input keyword using the log data, and storing the input rate of the at least one input keyword in association with input time data in a database;
identifying, in the database, the input time data associated with the at least one input keyword during a sliding window, and determining a number of times the at least one input keyword has been input to the at least one search server during the sliding window;
determining an estimated search input rate of the at least one input keyword by referring to the number of times the at least one input keyword has been input to the at least one search server during the sliding window;
ranking the at least one input keyword using the number of times the at least one input keyword has been input to the at least one search server during the sliding window;
determining a first criterion value for the at least one input keyword by using the ranking;
determining a second criterion value for the at least one input keyword by using a minimum search number and the estimated search input rate; and
detecting in real time an input keyword having an increased input rate, based on the first criterion value and the second criterion value.

15. A system for detecting a rate of input, the system comprising:
a log collection unit configured to collect log data, the log data comprising at least one input keyword from at least one search server during a time interval;
an input number estimation unit configured to determine an input rate of the at least one input keyword using the log data, and to store the input rate of the at least one input keyword in association with input time data in a database;
an input number adding unit configured to identify, in the database, the input time data associated with the at least one input keyword during a sliding window, and to determine a number of times the at least one input keyword has been input to the at least one search server during the sliding window;
a search number calculation unit configured to determine an estimated search input rate of the at least one input keyword by referring to the number of times the at least one input keyword has been input to the at least one search server during the sliding window;
a criterion value calculation unit configured to determine criterion values by using the estimated search input rate; and a keyword detection unit configured to detect in real time an input keyword having an increased input rate, based on the criterion values.

16. The system of claim 15, wherein the sliding window comprises a period of length n, wherein the n is greater than zero; and wherein the input number adding unit is configured to identify at least one time entry included in a prior period of length n on the basis of recently received time data.

17. The system of claim 15, wherein the criterion value calculation unit is further configured to calculate a first criterion value using an average search number and a standard deviation for the input keyword; and wherein the keyword detection unit is configured to detect at least one input keyword having an increased input rate, by reference to the first criterion value.

18. The system of claim 17, wherein the first criterion value is calculated by adding the average search number to a product of the standard deviation and a multiplier number.

19. The system of claim 15, wherein the criterion value calculation unit is further configured to calculate a second criterion value for each of the at least one input keywords by using an exponentially weighted moving average control chart; and wherein the keyword detection unit is configured to detect at least one input keyword having an increased input rate by reference to the second criterion value.

20. The system of claim 19, wherein the second criterion value comprises upper control limit information for the at least one input keyword calculated using the exponentially weighted moving average control chart.

21. The system of claim 15, wherein the criterion value calculation unit is configured to calculate a third criterion value as an inverse number of the ranking of the at least one input keyword.

22. The system of claim 15, wherein the criterion value calculation unit is configured to calculate a fourth criterion value by dividing an average search number by a minimum search number.

23. A method of detecting a rate of input, the method comprising:

collecting log data comprising at least one input keyword from at least one search server during a time interval and time of input information corresponding to the at least one input keyword;

determining an input rate of the at least one input keyword and a total number of inputs of the at least one input keyword during the time interval by using the log data;

determining a projected search input rate of the at least one input keyword using the input rate of the at least one input keyword during the time interval; and determining in real time an input keyword having an increased input rate with respect to a previous time interval based upon the determined input rate and the determined projected search input rate.

24. A system of detecting a rate of input, the system comprising:

a log collection unit configured to collect log data, the log data comprising at least one input keyword from at least one search server during a time interval and time of input information corresponding to the at least one input keyword;

an input number estimation unit configured to determine an input rate of the at least one input keyword and a total number of inputs of the at least one input keyword during the time interval by using the log data;

a search number calculation unit configured to determine a projected search input rate of the at least one input keyword using the input rate of the at least one input keyword during the time interval; and a keyword detection unit configured to detect in real time an input keyword having an increased input rate with respect to a previous time interval based upon the determined input rate and the determined projected search input rate.

* * * * *